July 1, 1930.  S. BOYER  1,769,874
CONDENSER AND MATERIAL FOR DIELECTRIC OR INSULATION PURPOSES
Filed Dec. 4, 1925  2 Sheets-Sheet 1
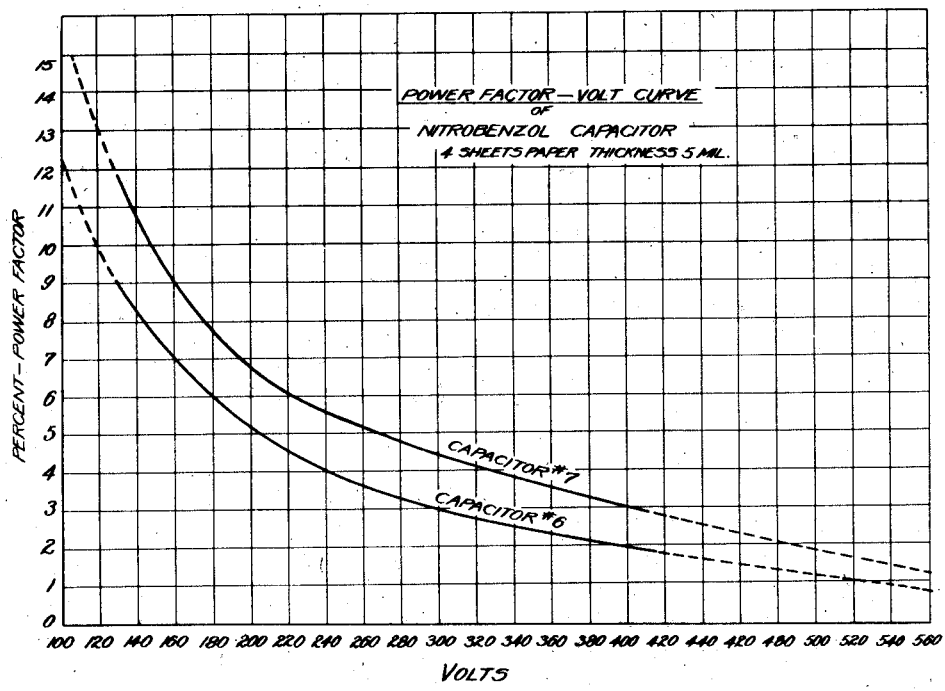
Inventor:
Sylvester Boyer,
by
His Attorney.

July 1, 1930.  S. BOYER  1,769,874
CONDENSER AND MATERIAL FOR DIELECTRIC OR INSULATION PURPOSES
Filed Dec. 4, 1925   2 Sheets-Sheet 2
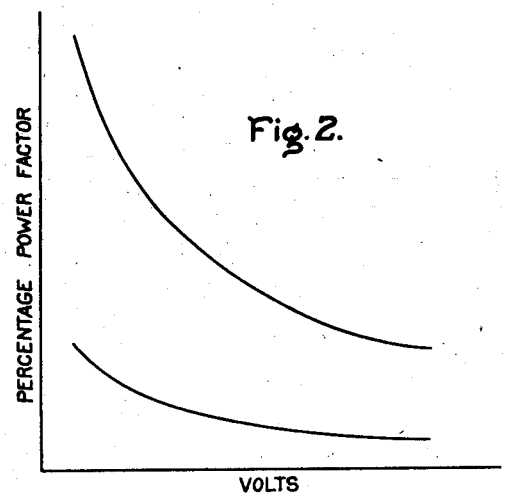
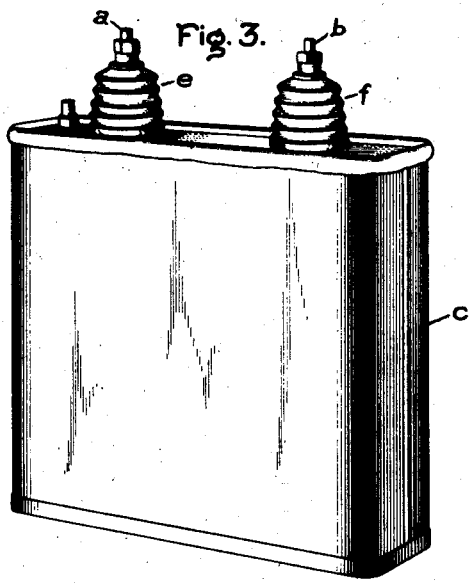
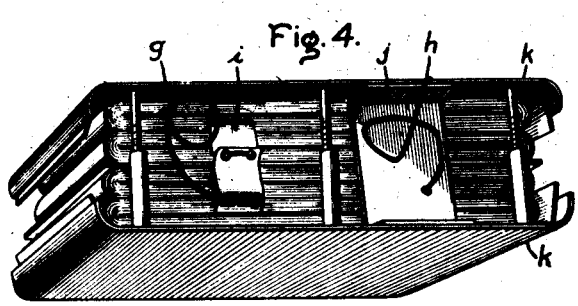
Inventor:
Sylvester Boyer,
by
His Attorney Patented July 1, 1930

1,769,874

UNITED STATES PATENT OFFICE

SYLVESTER BOYER, OF LYNN, MASSACHUSETTS, ASSIGNOR TO GENERAL ELECTRIC COMPANY, A CORPORATION OF NEW YORK

CONDENSER AND MATERIAL FOR DIELECTRIC OR INSULATION PURPOSES

Application filed December 4, 1925. Serial No. 73,273.

My invention relates to condensers, and to materials for insulation and dielectric purposes having high specific inductive capacity and high resistivity, and to the method of purifying or conditioning this material.

Claims for the removal of impurities by the use of an electric current have been made the subject of a co-pending application, Serial No. 245,777, filed March 5, 1927.
I have found that materials having high specific inductive capacity may if properly conditioned, be effectively used for insulation and for dielectric purposes, and that very effective condensers, for example, may be made from such materials.

My invention will be readily understood from the following specification and claims, reference being had to the accompanying drawing in which Figs. 1 and 2 indicate the effect of voltage pressure on the resistivity and therefore on the power factor of the material. Figs. 3 and 4 show a condenser with the features of the invention.

Among the materials having high specific inductive capacity may be listed the following with their respective values:

| | |
|---|---|
| Nitrobenzene | 38 |
| Nitrotoluene | 28 |
| Paraldehyde | 13 |
| Acetophenone | 18 |
| Titanium oxide | 89 |

Heretofore condensers have been made with dielectric materials, such as paper saturated with transil oil. I have found that in place of paper saturated with transil oil I may use paper saturated with some of the foregoing materials, such a nitrobenzene. Paper used for condenser purposes has a specific inductive capacity of about 4 while nitrobenzene, as above indicated, has an inductive capacity of about 38. Paper impregnated with nitrobenzene has an inductive capacity of about 18 or 20. The same paper saturated with transil oil has an inductivity of only about 3.1, consequently paper impregnated with nitrobenzene has an inductive capacity of about six times that of paper with oil. From the standpoint of cost, nitrobenzene is worth about three times as much as oil. Nevertheless, inasmuch as paper saturated with nitrobenzene has an inductive capacity six times as great, a condenser of the same capacity as an oil paper condenser can be made having about $\frac{1}{6}$ this size. Therefore, a nitrobenzene condenser will need about $\frac{1}{6}$ the amount of material so that in the end the nitrobenzene paper condenser can be made at a cost of about $\frac{1}{2}$ or less the cost of an oil paper condenser.

It will be understood that if the condenser elements are properly spaced any one of the materials above listed may be used as a dielectric alone. For example, nitrobenzene may be used alone in place of paper saturated with nitrobenzene or titanium oxide powder may be used or a combination of these materials may be used, as for example, titanium oxide saturated with nitrobenzene.

I have found, however, that these materials as ordinarily available, have low resistivity and high power factors, and I have further found that their low resistivity is due to the presence of certain impurities. I have also found that these materials may be conditioned by removing the impurities and thus increasing the resistivity to a point which will render them effective as resistances or as dielectrics for condensers or capacitors. One of the objects of my invention is to provide high inductive capacity material with low power factor.

I find, for example, that nitrobenzene commonly has impurities in the form of water and acids, but that these may be reduced and the nitrobenzene conditioned so as to raise the resistivity to the required amount, for example, the resistivity of nitrobenzene may be raised to a point about $2 \times 10^{10}$ ohms per centimeter cube, whereupon it becomes an excellent material for insulation or dielectric purposes.

I have found, for example, that nitrobenzene may be treated with aluminum oxide for reducing the water impurities and thereby increasing the resistivity. Aluminum oxide is especially effective in this connection because it is finely divided, does not go into solution in quantities, and is easily dried and separated from the nitrobenzene by heating after it has been used as a dehydrating agent, and therefore may be used over and over again. In conditioning nitrobenzene I have also found that aluminum oxide may also be used for reducing the acid impurities. A number of other basic oxides may be used in place of the aluminum oxide, however, such as calcium oxide or barium oxide which are particularly effective. The process of increasing the resistivity of nitrobenzene by the use of aluminum oxide is as follows:

Freshly ignited aluminum oxide is added to the impure nitrobenzene, such as commercial nitrobenzene, in proportions depending upon the percentage of impurities. In some instances the proportion may be one part of aluminum oxide by volume to from thirty to ten parts by volume of nitrobenzene. The mixture is thoroughly agitated at room temperature for about eight hours. The mixture is then warmed after which the aluminum oxide settles out and the nitrobenzene is then distilled off. In this process the first parts of the distillate are discarded. The distilled nitrobenzene is then again distilled. Nitrobenzene thus conditioned may be obtained having a specific resistivity as high as $2 \times 10^{10}$ ohms per centimeter cube at 550 volts D. C. In this connection it should be stated that I have found that the specific resistivity of the material when subjected to an impressed voltage increases with time and therefore the readings for resistivity should be taken some time after the resistivity value has become more or less constant.

It should be noted that commercial nitrobenzene may contain, among other impurities, nitric and sulphuric acids in traces, and water aggregating possibly several per cent. In this condition nitrobenzene has an appreciable conductivity. A cell with nitrobenzene in series with the voltmeter used as a milliammeter may serve as an indicator for the degree of purity of the material. When the potential is first applied the resistivity may be comparatively low and after an interval of five minutes or more, the resistivity may be found to be considerably higher. The following table of readings taken in connection with commercial, and also in connection with conditioned nitrobenzene, is an illustration:—

*Unconditioned nitro-benzene*

| Minutes | 0 | 1 | 5 | 10 | 15 |
|---|---|---|---|---|---|
| Volts | 300 | | 12 | 11.0 | |

*Conditioned nitro-benzene*

| Minutes | 0 | 1 | 5 | 10 | 15 |
|---|---|---|---|---|---|
| Volts | | 5 | 2 | 1 | |

The following table will illustrate the change in degree of purity with distillation of commercial nitrobenzene.

*Commercial nitro-benzene*

| Minutes | 0 | 5 | 10 | Volume distilled |
|---|---|---|---|---|
| Volts | | | | Per cent |
| (a) | 550 | 190 | | 20 |
| (b) | 500 | 90 | | 20 |
| (c) | 400 | 40 | | 20 |
| (d) | 350 | 20 | | 15 |
| (e) | 325 | 15 | | 15 |
| (f) | 300 | 12 | 11 | 10 |

The entire sample, it will be seen, was distilled, and it will be observed that distillation concentrated impurities in the first portions, but does not remove all of them, possibly traces of sulphuric acid distilled over with the nitrobenzene, since nitrobenzene has a boiling point somewhat above that of sulphuric acid. Results indicate that this sample of oil was not purified by fractional distillation alone.

To further illustrate the effect of electric pressure upon the resistivity of a material, I will refer to the curves in the drawing which furnish examples of two special capacitors which are identified as capacitors 6 and 7. These capacitors are made each with the condensing plates separated by paper impregnated with nitrobenzene. These capacitors after they had been subjected to electric pressure for some time were subjected to pressure again up to 400 volts and the results are indicated in Fig. 1. In Fig. 2 I have shown the results obtained by initially subjecting a capacitor to varying voltages. The readings obtained are indicated by the upper curve in Fig. 2. The capacitor was then subjected to electric pressure for a number of days whereupon readings were again taken with the results indicated by the lower line in Fig. 2. It was found that the lowering of the power factor of the capacitor was permanent. The results indicated in Fig. 1, it will be seen, fall somewhere between the upper curve of Fig. 2 and the lower curve of Fig. 2. In Fig. 3 there is shown a capacitor having the features of the invention. This capacitor is shown in its casing. In Fig. 4 the capacitor is shown without the casing. The capacitors used in the preparation of the curves shown in Fig. 1 were made each with four sheets of half-mil paper impregnated with nitrobenzene. It will be seen that with increased voltage there is a permanent lowering of the power factor. The decrease in the power factors is much greater at lower than at higher voltages as indicated in Fig. 2 which shows the effect of pressure on power factor. The curves indicate that the power factors of the two condensers 6 and 7 when subjected to a pressure of 400 v. fall to 2 and 3 respectively, while at 130 v. the power factors fall only to 9 and 12 respectively. The curves further indicate that at 600 v. the corresponding power factors should be .4 and .9 respectively. In tests made in connection with the capacitors No. 6, I found that by applying a pressure of 440 v. the power factor was permanently lowered from 6.8% to 4.5%. The decrease in heating at 440 v. as compared with the higher heating, the 200 v. gives evidence of the change in the power factor.

It will be understood of course that if the only impurity present in the material which maintains the resistivity at a low point is water that by removal of a sufficient portion or all of the water, the resistivity can be raised to the proper point. The same is true with respect to acid impurities or any other impurity that may operate to lower the resistivity.

I have also found that by starting with a pure material having high resistivity, such as nitrobenzene, that by adding an impurity such as water, the resistivity is materially decreased and this is the case even though comparatively small quantities of the impurity be added, but I have found, when small quantities of the impurity are added, that by subjecting the material with the impurity to an impressed voltage the resistivity is increased, and may even be restored.

I have also found when an absorbent material such as paper, which of course contains impurities, is saturated with pure nitrobenzene, that by subjecting the impregnated paper to an impressed voltage, the resistivity is materially increased. This indicates that before the voltage pressure is applied, the resistivity is not a maximum due to the presence of the impurities, and that by the application of the voltage pressure some action takes place (as when the electric pressure was applied to the nitrobenzene to which water was added), which converted the impurities of the combination to such an extent as to increase the resistivity to a point approximating or corresponding to that of the paper had it had no impurities. This may be a possible explanation. At any rate, I find that if the resistivity of a material is low due to the presence of impurities, by the application of electric pressure the resistivity is materially increased as though it had undergone a purification.

It will be understood that I do not wish to be limited to the materials listed in the foregoing inasmuch as other materials may be substituted for nitrobenzene, nitrotoluene, etc., listed above, as for example, pyridine, quinoline, chlorobenzene, bromobenzene, isoamylacetate, isoamylbenzoate, methyl benzoate, ethyl bromide, acetonitrile, butyraldehyde, methyl ethyl ketone, acetaldehyde, ethyl nitrate, ethyl iodide, ethyl acetate, chloroform, aniline, benzyl cyanide, anisaldehyde, ethylene chlorohydin.

By the use of materials described, such as nitrobenzene, I am able to make condensers which size for size have five to six times the capacity of the commercial condensers heretofore used. Furthermore, such condensers proportionately are much cheaper and possess the characteristics which no condensers have hitherto possessed, namely, that the resistivity rises and the power factor falls with age. Materials such as nitrobenzene, nitrotoluene and the like, listed in this specification, are very effective as dielectric materials after they have been conditioned because they have a low index of ionization as compared with water, alcohol and the like. One form of condenser in which the dielectric of the invention may be used is shown in Fig. 3. This condenser is provided with terminals $a$ and $b$ which are connected with the plates of the condenser within the container $c$ through the bushings $e$ and $f$ by means of leads $g$ and $h$. As shown, the lead $g$ is connected with a number of metal strips $i$ which connect with the metal elements of the condenser in the usual manner. The lead $h$ is connected to another set of similar strips which are covered by an insulating plate $j$ which latter prevents any short-circuiting between such terminals and the frame. The protecting plate for the terminal $i$ is not shown for clearness of illustration. The form of condenser shown in Fig. 4 is made in four sections all of which are clamped together by means of clamping plates $k$. After the sections are clamped together as indicated they are placed within the container $c$ which container is filled with nitrobenzene of the invention. It will be understood that the condenser is vacuum treated and impregnated with nitrobenzene, the method being the same as that used in the manufacture of condensers immersed in oil.

It will also be understood that in view of the disclosure modifications may be made in the condenser and variations in the details of the process without departing from the spirit of the invention or the scope of the claims contained herein. The specific illustrations have been given in order to comply with the statutes and to enable the invention to be more readily understood.

I also wish it understood that in the claims in this specification, when I use the term "liquid" I mean a material which is liquid at ordinary atmospheric temperatures, such as 120° F. and under.

What I claim as new and desire to secure by Letters Patent of the United States is:—

1. A condenser dielectric comprising a liquid material having an inductive capacity of 9 and over, and a resistivity of the order of $1 \times 10^9$ ohms per centimeter cube.

2. A condenser dielectric comprising paper impregnated with nitrobenzene having a resistivity of the order of $10^9$ ohms per centimeter cube.

3. An aromatic nitrogen compound having a specific inductive capacity above 9 and a resistivity of the order of $1 \times 10^9$ ohms per centimeter cube.

4. A condenser dielectric comprising paper impregnated with a liquid material having a high specific inductive capacity and high specific resistivity, the inductivity of the impregnated paper being of the order of 10 and over and the specific resistivity being of the order of $10^9$ ohms per centimeter cube and over.

5. A condenser dielectric comprising nitrobenzene having a resistivity of the order of $2 \times 10^{10}$ ohms per centimeter cube.

In witness whereof, I have hereunto set my hand this thirtieth day of November, 1925.

SYLVESTER BOYER.